Sept. 27, 1927.

C. A. BARBOUR, JR 1,643,736

PROCESS OF MANUFACTURE OF CARBON BLACK

Filed March 1, 1926    4 Sheets-Sheet 1

Inventor
C. A. Barbour Jr.
By William C. Linton
Attorney

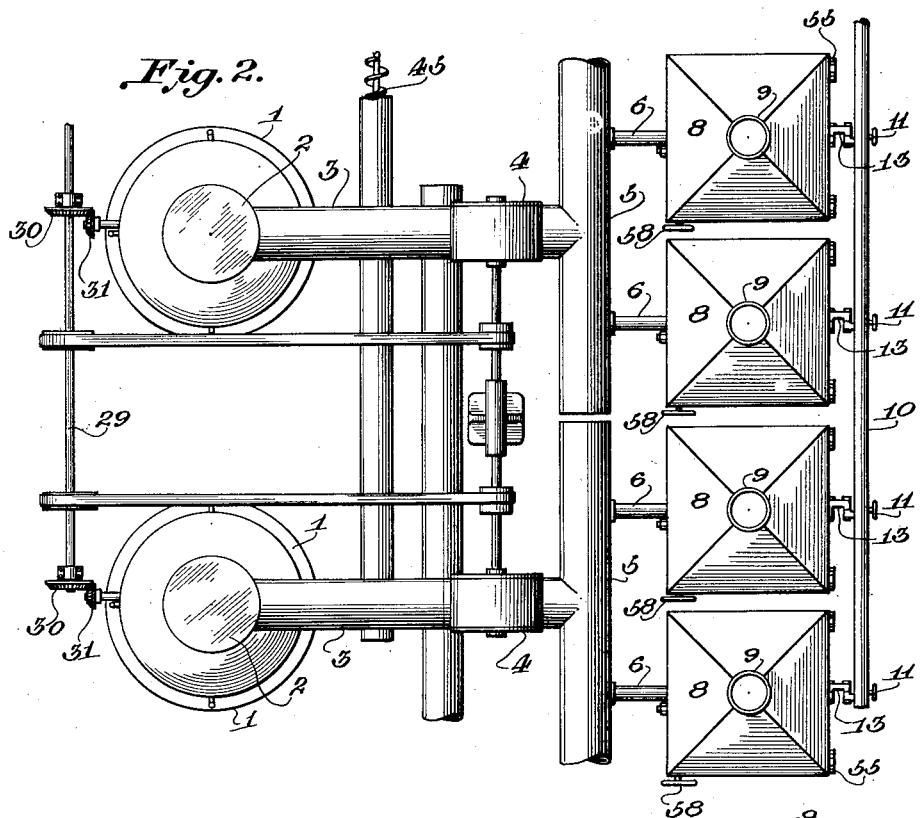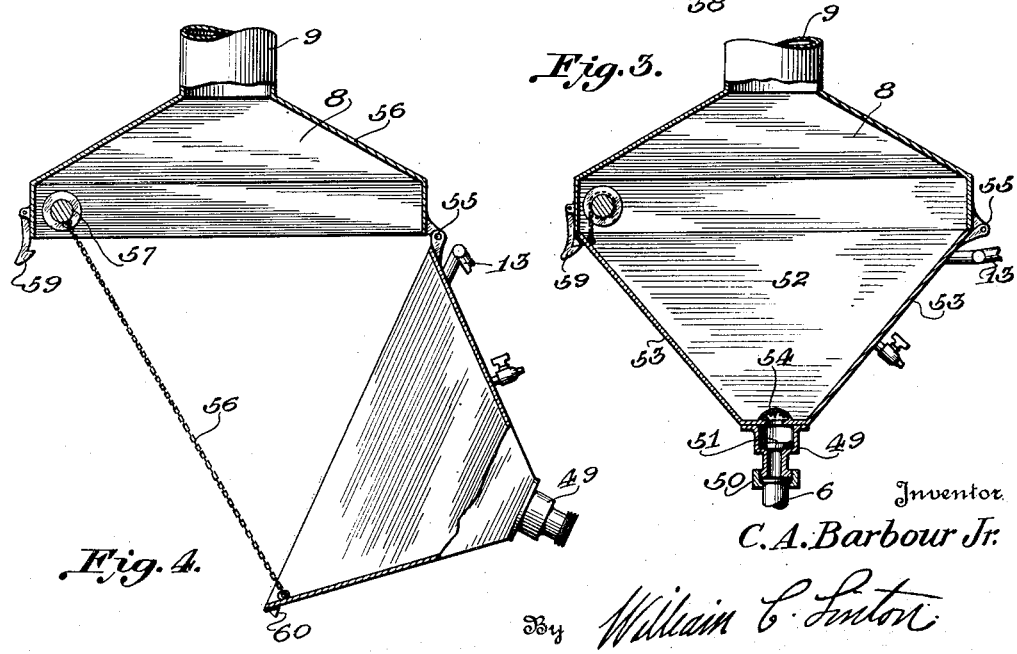

Sept. 27, 1927. 1,643,736
C. A. BARBOUR, JR
PROCESS OF MANUFACTURE OF CARBON BLACK
Filed March 1, 1926 4 Sheets-Sheet 3

Inventor
C. A. Barbour Jr.
By William C. Linton
Attorney

Sept. 27, 1927.
C. A. BARBOUR, JR
1,643,736
PROCESS OF MANUFACTURE OF CARBON BLACK
Filed March 1, 1926     4 Sheets-Sheet 4
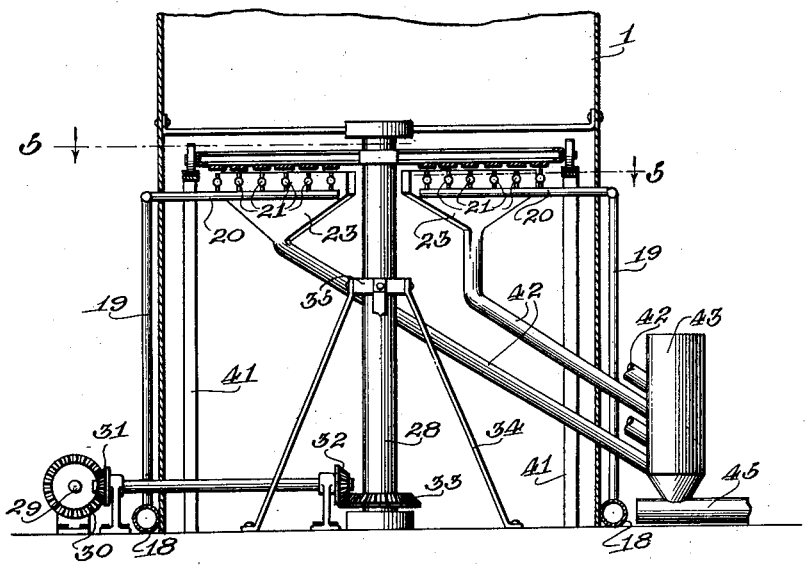
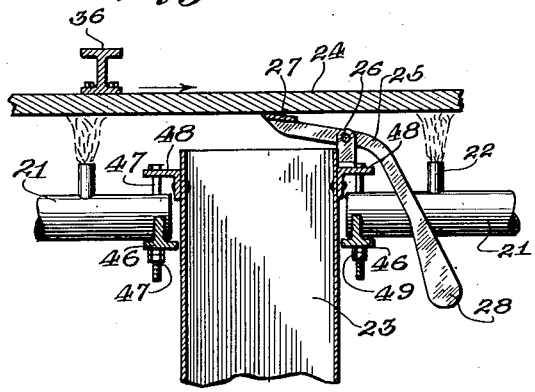
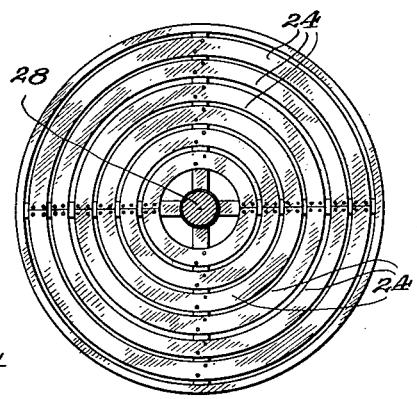
Inventor
C. A. Barbour Jr.
By William E. Linton
Attorney Patented Sept. 27, 1927.

1,643,736

UNITED STATES PATENT OFFICE.

CLYDE A. BARBOUR, JR., OF MONROE, LOUISIANA.

PROCESS OF MANUFACTURE OF CARBON BLACK.

Application filed March 1, 1926. Serial No. 91,501.

This invention relates to improvements in an apparatus and process for utilization in the efficient and economical production of carbon black from natural or other gases, wherein a maximum carbon black yield will be obtained from those gases or products of combustion given off from or incidental to combustion in the usual retort, such products being subjected to treatment in a manner to minimize the wastage of carbon black particles through exhaustion or carriage from the apparatus in the tail gases from the burners proper.

It is also an equally important object of the invention to provide a process, novel in this art, for burning natural gases, whereby to produce carbon black through the conduction of the burning under conditions peculiar to this process, that a greater yield of carbon black is obtained than in heretofore practiced or prevalent processes.

The invention furthermore comprehends as an object of novelty and utility, the provision of apparatus for producing carbon black, which apparatus is of a construction and arrangement such as will permit its ready assembling or disassembling for transportation from one place to another, without entailing excessive or prohibited labor costs occasioned by those types of carbon black producing apparatuses or devices now known and in use in this art, which, as will be appreciated, are for the greater part, of permanent arrangement and disposition.

Other objects of the invention will become evident as these accompanying writings proceed into and through a detailed specification of the invention.

In order that the fundamental principle or underlying feature of my improved apparatus and process may be more clearly manifested to workers skilled in this particular art, it is deemed timely, at this point, to offer the following statement.

During the operation of the now prevalent or generally accepted and standard die type of carbon black producing plant, notwithstanding the fact that the principle involved therein is the burning of natural gas under incomplete combustion against a metallic surface, I have found through various channels or processes of experimentation that there is an excess of atmospheric oxygen present, this condition being caused by the method of drafting in the apparatus, together with the construction of the burning houses forming a part thereof. This statement, it is submitted, finds proof in the relatively small yield of carbon black per thousand cubic feet from the said process or method. In explanation of this disadvantage, it may be stated that in the heating of the ethane ($C_2H_6$) during combustion, acetylene ($C_2H_2$) is formed, which in turn, produces carbon and hydrogen. However, should there be an excess of atmospheric oxygen present during the combustion, the carbon combined, with the oxygen, results in carbon dioxide ($CO_2$) and as carbon dioxide ($CO_2$) is a nonsupporter of combustion, no carbon is separated and the carbon black production is thus decreased proportionately to the amount of carbon combining with the oxygen. Therefore, it will manifest itself to workers skilled in this art, that any method of manufacturing carbon black whereby the elimination of an excess of oxygen will be effected, will also increase the production of carbon black per thousand cubic feet, in that the ethane ($C_2H_6$) when heated, will be allowed to form its natural chemical combination—acetylene ($C_2H_2$), which in order, is converted into carbon and hydrogen.

Through the instrumentalities of my improved process and apparatus, which involves the manufacture of carbon black by method or process of partial vacuum, the drafting as usually referred to, will be entirely eliminated. In lieu thereof, suction from an aspirator will be substituted with, possibly, a small amount of control drafting from the bottom of the retort, as hereinafter more fully described. By this process or method practiced with the apparatus offered in illustration herewith, carbon suspended in gas or carbon smoke, coming from the retort, will be exhausted through a precipitator, where such gases will be washed in an oil or other suitable liquid practicable for usage in the production of printer's ink bases or other homogeneous gases. following which the remaining gases will pass off in a natural colorless state.

In the drawings accompanying this description and forming part thereof, and in which like reference characters in the several views denote corresponding parts.

Figure 2 is a plan view of Figure 1 showing the retorts and washers or precipitators arranged in multiple.

Figure 3 is a vertical section of one of the washers.

Figure 4 is another vertical sectional view of one of the washers, showing it in a discharge position.

Fig. 7 is a vertical sectional view of the lower part of the retort, showing among other things the driving mechanism for the collecting plates for the carbon or lamp black.

Fig. 8 shows the collecting plates with their lower or collecting surfaces uppermost.

Fig. 9 is a section taken along the line 9—9 of Fig. 6, looking in the direction of the arrows, and showing the position of the scraper for the collecting plates and the means for adjusting the burners relative to the plates.

Figure 1:
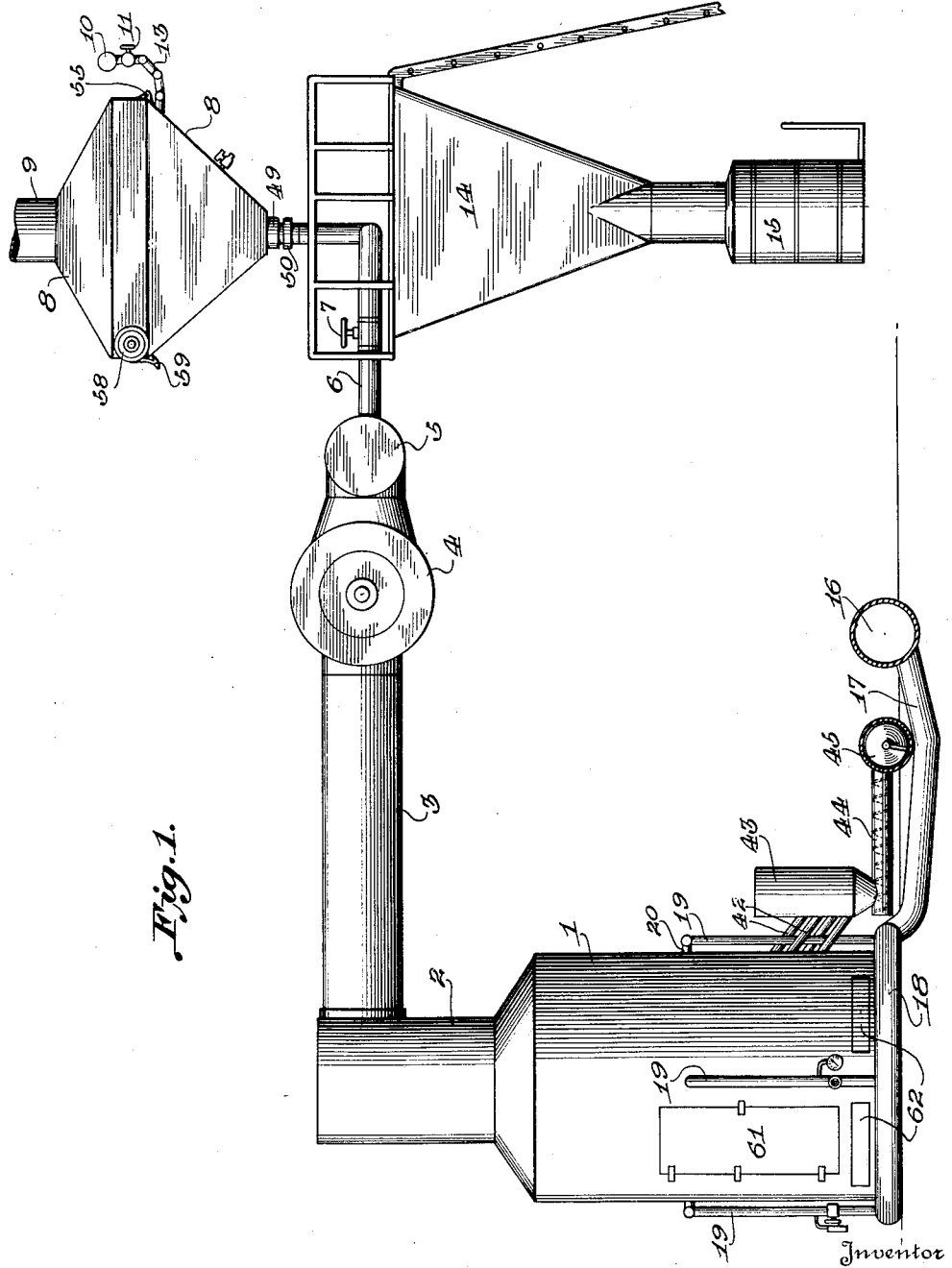
Figure 1 is a side elevation of the improved apparatus for producing carbon black or lamp black.

The general organization of apparatus in which my process is practiced is shown in Figs. 1 and 2 of the drawing. The remaining views of the drawing are devoted to details of construction of the parts shown in Figs. 1 and 2. Referring particularly to Figs. 1, 2, and 7, the numeral 1 designates the retorts in which the partial combustion of the natural or other gas for the production of carbon black is accomplished. The gases issuing from the heads 2 of the retort pass through the pipes 3 under the influence of the suction or vacuum fans 4 to the distributor pipes 5. From these distributor pipes 5, the gases are led by means of pipes 6 provided with valves 7 to the washers or precipitators 8. After the gases have been subjected to the action of the washer or precipitator they escape through the vent 9. The washer or precipitator 8 is fed with suitable washing fluids such as kerosene, fish oil, linseed oil, cotton seed oil, rape oil, castor oil, heavy petroleum or any oil which is not readily volatilized and which can serve when admixed with carbon black as a base for printer's ink. Such liquids enter the washer or precipitator 8 from the pipe line 10 which is connected with the interior of the several washers or precipitators through valves 11 and flexible pipe connections 13. Positioned below each of the several washers or precipitators is a hopper 14 for receiving the liquid charged with carbon black. Below each of the hoppers 14 is positioned a final collecting receptacle 15. It is preferable to arrange the retorts and washers or precipitators in multiple as shown in Fig. 2 in order that the operation of the apparatus can be substantially continuous.

The details of the retorts 1, shown generally in Fig. 1, are shown in Figs. 5, 6, 7, 8, and 9. Each of the retorts 1 are constructed similarly and hence a description of one of them is deemed sufficient. The retort is fed with natural or other suitable gas from the main 16 by the pipes 17, 18, 19, and 20, the latter pipes passing through the retort casing and connecting with the arc shaped pipes 21 provided with the burner tips 22 from which the burning gases issue. There are four sets of burners arranged in the same plane and each set is in the shape of a sector of a circle. The sectors are spaced from each other by means of four hoppers 23 into which the carbon black is deposited from the circular plates 24 positioned above the burner tips 22 through the scraping action of the weighted scrapers 25 pivoted beside the hoppers 23 at 26 and provided with scraping blades 27. The weighted lower arm 28 of the scraper 25 maintains the blades 27 against the under surface of the collecting plates 24.

The collecting plates 24 are circular in form and are mounted for rotation on the vertical shaft driven from the shaft 29 through gears 30, 31, 32, and 33 as shown in Figs. 2 and 7. The shaft 28 is suitably maintained in its vertical position by means of braces 34 carrying a bearing at their upper ends through which the shaft 28 passes. The collecting plates 24 are rigidly attached to the shaft 28 by means of radial arms 36 which are rigidly attached both to the plurality of collecting plates 24 and the shaft 28. The arms 36 are attached to the upper surfaces of the collecting plates 24 in order that their lower surfaces will remain unbroken or uninterrupted for the proper action of the scrapers 25. Outside of the outermost circular plate 24 a rim 37 constituted of angle iron is attached to the arms 36. The rim 37 carries a plurality of rollers or wheels 38 rotatable on horizontal studs carried by the rim 37. These wheels 38 are fitted for rotation within and bear upon a grooved track 40 supported on standards 41.

Figures 5, 6:
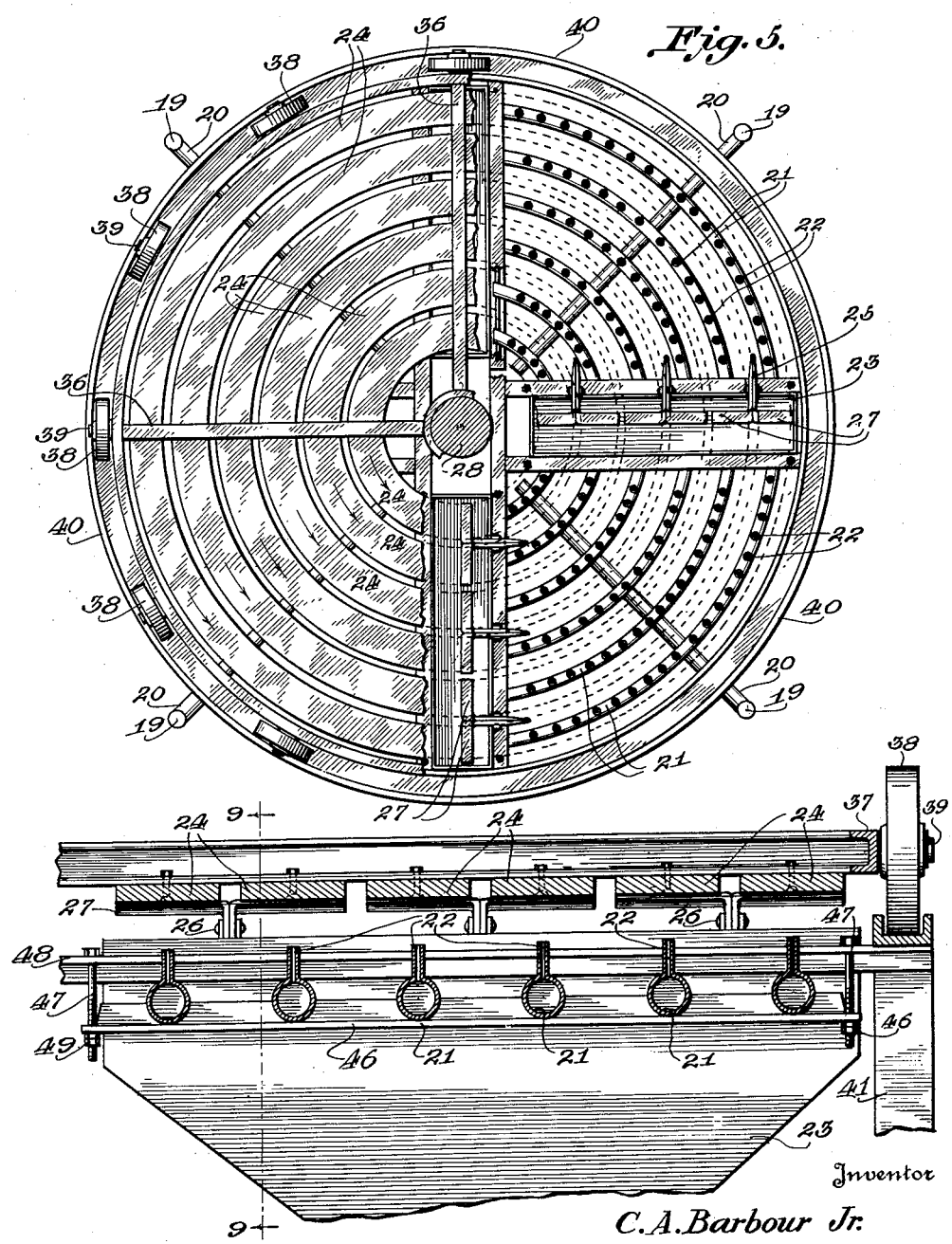
Figure 5 is a part sectional view of the collecting or burner plates of the retort taken along the line 5—5 of Figure 7, looking in the direction of the arrows. This view also shows the arrangement and relation of the burners, hoppers, and scrapers for the plates.
Fig. 6 is a detail view showing the relation and arrangement of the rotatable collecting plates, scrapers, burners, and a hopper.

The several arcuate sets of burners, as shown particularly in Fig. 5, of each sector are so positioned that each are immediately below a corresponding circular collecting plate. The carbon black formed by the action of the gas is thereby capable of being collected by the plates. The scrapers 25, heretofore described, remove the carbon black from the under surfaces of the plates 24 and deposits it within the hoppers 23 which discharge through pipes 42 into a common receiver 43 from which it is conveyed to any suitable point by means of screw conveyors 44 and 45. All the retorts are similarly constructed.

At times it becomes necessary to position the burners 22 nearer to or further from the collecting plates 24. For this purpose the burners are made adjustable and the means I have devised for accomplishing this purpose are shown in detail in Figs. 6 and 9. The arc shape pipes 21 carrying the burners 22 are supported between the hoppers on straps 46 movably positioned on each side of the hoppers. The straps 46 are in turn supported by bolts 47 suspended from the brackets 48 attached to the sides of each hopper. The bolts are provided with nuts 49. It will be obvious from the foregoing that the burners are raised or lowered by raising or lowering the nuts 49 on the stem of the bolts 48.

The gases leaving the retort and passing through the suction fan pass through the pipe connections shown in Figs. 1 and 2 to the washer or precipitator 8 for collecting the particles of carbon black escaping collection in the retort 1. The gases enter the lower part of the washer through the pipe 6 (see Figs. 3 and 4) which is coupled to the lower part of the valve casing 49 of the washer by means of a screw coupling 50. Within the valve casing 49 is the valve 51 which prevents the downward flow of liquid through the valve casing and from the chamber 52 formed by the inclined sides 53 of the washer. The several liquids serving as a base for inks are placed within the chamber 52 and the gases forced through them by the action of the fans 4. At the lower part of the chamber 52 there is positioned a distributor 54 for dividing the gases into fine streams for the purpose of producing an intimate contact of the gases with the liquid contained in chamber 52. As the gases rise through the liquid they will be freed of carbon particles practically completely, with the result that the gases escaping through the vent 9 are substantially wholly carbon dioxide and nitrogen.

The chambers 52 are hinged at 55 to the upper hoods 56 of the washers. These hoods collect the gases rising through the liquids in chamber 52 and conduct them away through vents 9 at the top of the hoods. Fig. 4 shows the hopper 52 in its discharging position. The liquid is discharged into the hopper 14 in the manner shown when the liquid contained in the chamber 52 has taken up enough carbon for the purpose desired. The chain 56, shown in Fig. 4, is attached at one end to the hinged chamber 52 and at its other end to the shaft 57 which is rotatable by means of the hand wheel 58. The chamber is raised or lowered by turning the hand wheel 58. A latch 59 and catch 60 are provided for retaining the chamber 52 in its raised position.

Referring particularly to Fig. 1 it will be observed that the retort 1 is provided with a door 61 permitting entry for repair, adjustment, or positioning of parts. Draft regulators 62 are also provided for permitting the entry of the necessary amount of air for producing the combustion required by the process of the present application.

In conducting the combustion of natural gases I have found that greater quantities of carbon black can be produced from a given quantity of gas when an excess of atmospheric oxygen is avoided. In the apparatus above described I am able to avoid an excess of oxygen for the reason that the combustion is carried on within a closed retort and the amount of oxygen combining with the natural gases can be regulated accurately by properly positioning the draft regulators 62 combined with the more or less intensive operation of the fans 4. The fans 4 produce in addition a partial vacuum in the retorts 1. When there is an excess of oxygen present not only the hydrogen of the hydrocarbons producing carbon black is oxidized, but also considerable carbon is oxidized to carbon dioxide. Consequently it is an object of the present mode of operation to admit just sufficient air to deprive the hydrocarbons of their hydrogen content without oxidation or substantial oxidation of their carbon content. As an illustration ethylene, $C_2H_4$, will be considered. Under the regulation of the oxygen entering the retort 1 described above, the ethylene will be first changed by oxidation of part of its hydrogen into acetylene, $C_2H_2$, which in turn by further oxidation of hydrogen will be converted into carbon. When, according to the usual commercial processes, an excess of oxygen is present, a large part of this carbon is lost by conversion into carbon dioxide which escapes as a gas. The process forming the subject matter of the present application has given splendid yields of carbon when applied to the natural gases occurring in the gas fields of northern Louisiana.

In the manufacture of carbon black by my method utilizing a partial vacuum, drafting as usually referred to will be entirely eliminated, the suction from the draft fan taking its place, with possibly a small amount of control drafting from the bottom of the retort. Even under the method of the present application all the carbon formed within the retorts 1 will not be collected therein, as some carbon will be held in suspension in the gases remaining after combustion. However, as described above, the suspended carbon and gas or carbon smoke is exhausted through a precipitator or washer where the gases will be washed in oil or any other liquid for the manufacture of printer's ink base or other homogeneous mass, the remaining gases passing off in their natural colorless state.

Having described my invention what I claim and desire to secure by Letters Patent is:

1. The method of producing carbon black which comprises burning hydrocarbons in a retort under a partial vacuum and with an amount of air sufficient to form a substantial amount of free carbon from said hydrocarbons, separating and collecting free carbon so formed while in said retort, and withdrawing the tail gases after the free carbon has been collected from said hydrocarbon.

2. The method of producing carbon black which comprises burning hydrocarbons in a retort under a partial vacuum and with an amount of air sufficient to form a substantial amount of free carbon from said hydrocarbons, separating the free carbon so formed while in said retort, collecting the free carbon from said retort which has been so separated from the hydrocarbons therein, withdrawing the tail gases after the free carbon has been collected from said hydrocarbons and subsequently separating any free carbon that may remain in said tail gases.

3. An apparatus for producing carbon black comprising in combination a retort for burning hydrocarbons under a partial vacuum, means for collecting a portion of the carbon black within said retort, an aspirator for withdrawing products of combustion from said retort and a gas washer for receiving the gases withdrawn by said aspirator.

4. A carbon black producing apparatus comprising in combination a plurality of retorts, carbon producing and collecting means within each retort, an outlet pipe communicating with each retort whereby the tail gases may be conveyed therefrom, an aspirator arranged within each outlet pipe, means for jointly operating said aspirators and collecting means, and a plurality of precipitators communicating with each outlet pipe.

5. A carbon black producing apparatus comprising in combination, a retort, carbon producing and collecting means within said retort, an outlet pipe leading from said retort, precipitators communicating with said outlet pipe each comprising a hood and a chamber hingedly connected to each hood.

6. A carbon producing apparatus comprising in combination a track, a rotatable shaft positioned therein, a frame connected to said shaft and adapted to travel upon said track, a plurality of carbon collecting plates carried by said frame, burners arranged below said plates, hoppers arranged between said burners and means carried by said hoppers for adjustably supporting said burners.

7. A carbon producing apparatus comprising in combination a support, a frame rotatably mounted upon said support, a plurality of carbon collecting plates carried by said frame, a plurality of sets of burners arranged below said plates, a hopper positioned between each set of burners and brackets carried by said hoppers and support for adjustably supporting said burners.

8. A carbon producing apparatus comprising in combination a support, a track mounted upon said support, a driven shaft arranged within said support, radially extending arms connected to said shaft, a rim connected to said arms having rollers adapted to travel upon said track, carbon collecting plates secured to the lower faces of said arms, hoppers positioned below said plates, weighted scrapers carried by said hoppers and adapted to contact with said plates and burners arranged below said plates and between said hoppers.

In witness whereof I have hereunto set my hand.

CLYDE A. BARBOUR, Jr.